United States Patent
Lambert et al.

(10) Patent No.: US 7,741,579 B2
(45) Date of Patent: Jun. 22, 2010

(54) FLUSHING LINES OR CAVITIES OF A LASER PROCESSING MACHINE

(75) Inventors: Martin Lambert, Korb (DE); Uwe Mienhardt, Korntal-Münchingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 11/363,541

(22) Filed: Feb. 24, 2006

(65) Prior Publication Data

US 2007/0051709 A1 Mar. 8, 2007

(30) Foreign Application Priority Data

Feb. 25, 2005 (EP) ................... 05004176

(51) Int. Cl.
*B23K 26/00* (2006.01)
(52) U.S. Cl. .............. 219/121.84; 219/121.6; 219/121.86
(58) Field of Classification Search ........... 219/121.84, 219/121.6, 121.86
See application file for complete search history.

(56) References Cited

U.S. PATENT DOCUMENTS

| | | | | |
|---|---|---|---|---|
| 5,367,142 A | * | 11/1994 | Gabzdyl et al. | 219/121.67 |
| 5,763,855 A | * | 6/1998 | Shioji | 219/121.84 |
| 5,811,753 A | * | 9/1998 | Weick et al. | 219/121.78 |
| 6,204,473 B1 | * | 3/2001 | Legge | 219/121.67 |
| 6,252,648 B1 | * | 6/2001 | Hase et al. | 355/53 |
| 6,341,006 B1 | * | 1/2002 | Murayama et al. | 355/53 |
| 6,538,232 B2 | * | 3/2003 | Lambert | 219/121.84 |

FOREIGN PATENT DOCUMENTS

| | | |
|---|---|---|
| DE | 3927451 | 7/1990 |
| EP | 0 533 387 | 3/1993 |
| JP | 64-057994 | 3/1989 |
| JP | 02-063693 | 3/1990 |
| JP | 04-162977 | 6/1992 |
| JP | 07-328787 | 12/1995 |
| JP | 09-192871 | 7/1997 |
| JP | 11-033768 | 2/1999 |
| JP | 11342489 | 12/1999 |
| JP | 2001-150172 | 6/2001 |

* cited by examiner

*Primary Examiner*—M. Alexander Elve
(74) *Attorney, Agent, or Firm*—Fish & Richardson P.C.

(57) ABSTRACT

Flushing gas lines of a laser processing machine, by supplying a flushing gas to the system in a series of pressure impulses greater than a residual processing gas pressure after completion of a processing sequence, and allowing the supplied flushing gas to expand and mix with any residual gas between successive pressure impulses, to substantially clear the processing gas from the system.

13 Claims, 3 Drawing Sheets

FLUSHING LINES OR CAVITIES OF A LASER PROCESSING MACHINE

CROSS REFERENCE TO RELATED APPLICATIONS

This application claims priority under 35 USC §119(a) from European patent application EP 05004176, filed Feb. 25, 2005. The complete disclosure of this priority application is incorporated herein by reference.

TECHNICAL FIELD

The invention relates to flushing lines and/or cavities of a laser processing machine, such as a laser welding machine, using a corresponding gas.

BACKGROUND

Laser cutting is assisted by adding gas. Oxygen, nitrogen, argon or air are used as cutting gases. Different gases are used depending on laser processing. When changing gases, the previously used gas must preferably be completely expelled or escape, and be replaced by another gas, since residual gas amounts of the previously used gas may have a detrimental effect on subsequent laser processing. Known flushing methods include evacuating the nozzle of a laser processing head before changing gases, or extending the continuous flushing time until any foreign gas has been removed from the process gas. Only a little flow forms in individual areas of the gas path between the gas valve and the cutting nozzle when the gas is flowing at a constant rate, such that it is not possible to quickly expel all of the previously used gas. While insufficient flushing times reduce the process quality, excessive flushing times reduce the productivity or incur unnecessary costs through gas consumption.

SUMMARY

The invention features a method for flushing lines and/or cavities of a laser processing machine with a corresponding gas to improve the quality and/or the time required for this process. In one aspect, the flushing gas is discontinuously supplied under a pressure which is higher than the pressure that prevails in the lines and/or cavities, and can expand after supply. This method yields similar degrees of purity in a substantially shorter time than techniques where the flushing gas that is used is the second cutting gas. Under unfavorable conditions, the duration of known flushing methods can may not be long enough to completely expel the previously used process gas. This method can yield comparable gas purity degrees as in other methods but can reduce the overall flushing time and consumption of flushing gas. Furthermore, such a method can be performed without additional evacuation pumps.

The flushing gas can be discontinuously supplied in a simple preferred fashion by applying several successive gas pressure impulses.

The cleaning effect may be enhanced in that the gas in the lines and/or cavities, which was initially provided to assist laser processing, can expand, which normally produces an atmospheric pressure in the lines and/or cavities.

To achieve effective flushing in lines or cavities having a small diameter, the number of gas pressure impulses can be increased as the diameter of the laser processing nozzle decreases.

According to one aspect, a method of flushing processing gas from lines or cavities of a laser processing machine includes providing a pressurized flushing gas, discontinuously supplying the flushing gas to the lines or cavities of the laser processing machine at a pressure higher than a residual gas pressure remaining in the lines, while allowing the supplied flushing gas to expand in the lines and mix with any residual processing gas between successive flushing gas impulses.

In some implementations, the flushing gas is discontinuously supplied with a plurality of successive pressure impulses, where the pressure of each pressure impulse is greater than the residual gas pressure. In some cases, the residual gas pressure falls to approximately atmospheric pressure between successive flushing gas pressure impulses. In some examples, the pressure of the impulse is greater than about 6 bars.

In some implementations, the method also includes selecting a number of successive pressure impulses based on a diameter of a laser processing nozzle of the machine. In some implementations, a relatively greater number of successive pressure impulses is selected for relatively smaller nozzle diameters. In some configurations, the processing gas is oxygen and the flushing gas is nitrogen. In some cases, the method is performed between successive workpiece processing operations, and the flushing gas includes a second processing gas.

According to another aspect, a laser processing machine flushing system includes a processing gas container connected through a processing gas valve to gas lines of a laser processing machine. In this aspect, the processing gas container is configured to store a pressurized processing gas. The flushing gas container is connected through a flushing gas valve to the gas lines of the laser processing machine and the container is configured to store a pressurized flushing gas. The machine also includes a controller configured to control the processing gas valve and the flushing gas valve, so as to flush the gas lines of the processing gas after closing the gas processing valve, by repeatedly opening and closing the flushing gas valve, while permitting flushing gas supplied to the gas lines to expand and mix with residual processing gas between flushing gas valve openings.

In some configurations, the controller is configured to automatically select a number of flushing gas valve cycles as a function of laser processing nozzle diameter. In some case, the processing gas valve and the flushing gas valve include pressure control valves.

The details of one or more embodiments of the invention are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
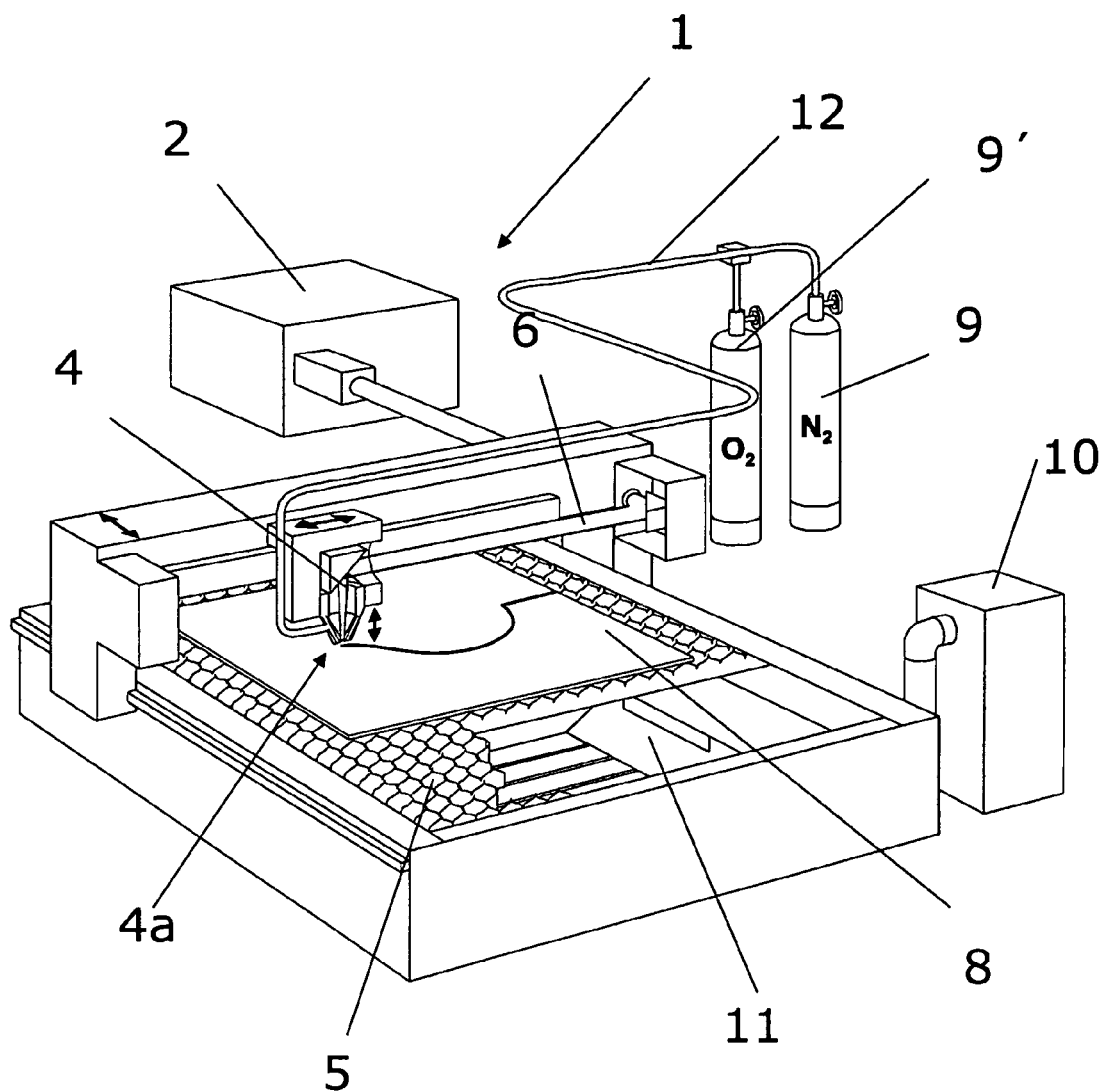
FIG. 1 shows a laser processing system for laser cutting.

FIG. 1 shows the structure of a laser processing system 1 for laser cutting using a CO2 laser, a laser processing head 4

(laser processing nozzle 4a) and a workpiece support 5. A generated laser beam 6 is guided to the laser processing head 4 by means of deflecting mirrors, and is directed onto a workpiece 8 by means of mirrors.

Prior to generation of a continuous kerf, the laser beam 6 penetrates through the workpiece 8. The sheet metal or plate 8 must be spot-melted or oxidized at one location, and the molten mass must be blown out. Penetration may be effected quickly (i.e., with full laser power) or slowly (via a so-called "ramp").

In case of slow penetration using a ramp, the laser power may be gradually increased, reduced and kept constant over a certain period until the penetration hole is produced. Both penetration and laser cutting are assisted by adding a gas. Oxygen, nitrogen, or compressed air may be used as cutting gases and/or application-specific gases contained in the gas containers 9, 9'. The decision about which gas is finally used depends on the materials to be cut and the expected quality of the workpiece.

Cutting with oxygen is usually performed with a gas pressure of maximally 6 bars. The material is melted at that location where the laser beam 6 is incident on the sheet metal 8 and is largely oxidized. The produced molten mass is blown out together with the iron oxides. Generated particles and gases can be extracted from a suction chamber 11 using a suction means 10. Additional energy is released during oxidation (exothermal reaction) which promotes the cutting process. The use of oxygen as cutting gas for cutting material thicknesses which can be processed both through oxygen cutting and nitrogen high-pressure cutting using the same laser power, realizes considerably higher cutting speeds or permits cutting of thicker materials as compared to the use of nitrogen.

If the process requires changing of the cutting gases and/or application-specific gases, the previously used gas must be expelled or escape and be replaced by the gas to be subsequently used. The residual gas amounts of the previously used gas have a detrimental effect on subsequent laser processing. For this reason, the previously used gas should be completely removed when the process gas is changed.

The flushing process can be performed in a discontinuous mode. For flushing a line 12, the laser processing head 4 and other cavities, a first short gas pressure impulse is initially applied into the line 12, into the laser processing head 4 and into the other cavities. Gas is supplied at a gas pressure which is higher than the gas pressure in the line 12, in the laser processing head 4, in the other cavities or in the surroundings. The gas subsequently expands in the line 12, in the laser processing head 4 and in the other cavities, and out of the laser processing head 4. A gas mixture of residual gas and flushing gas forms in the line 12, in the laser processing head 4 and in the other cavities, having approximately atmospheric pressure. The portion of residual gas in the gas mixture is further reduced by the second and each further gas pressure impulse. The gas mixture escapes until atmospheric pressure is reached again. After several gas pressure impulses and several gas expansion and escape cycles, the line 12, the laser processing head 4 and other cavities are almost free of residual or foreign gases. The gas from the first laser processing operation is almost completely replaced by another gas.

Figure 2:
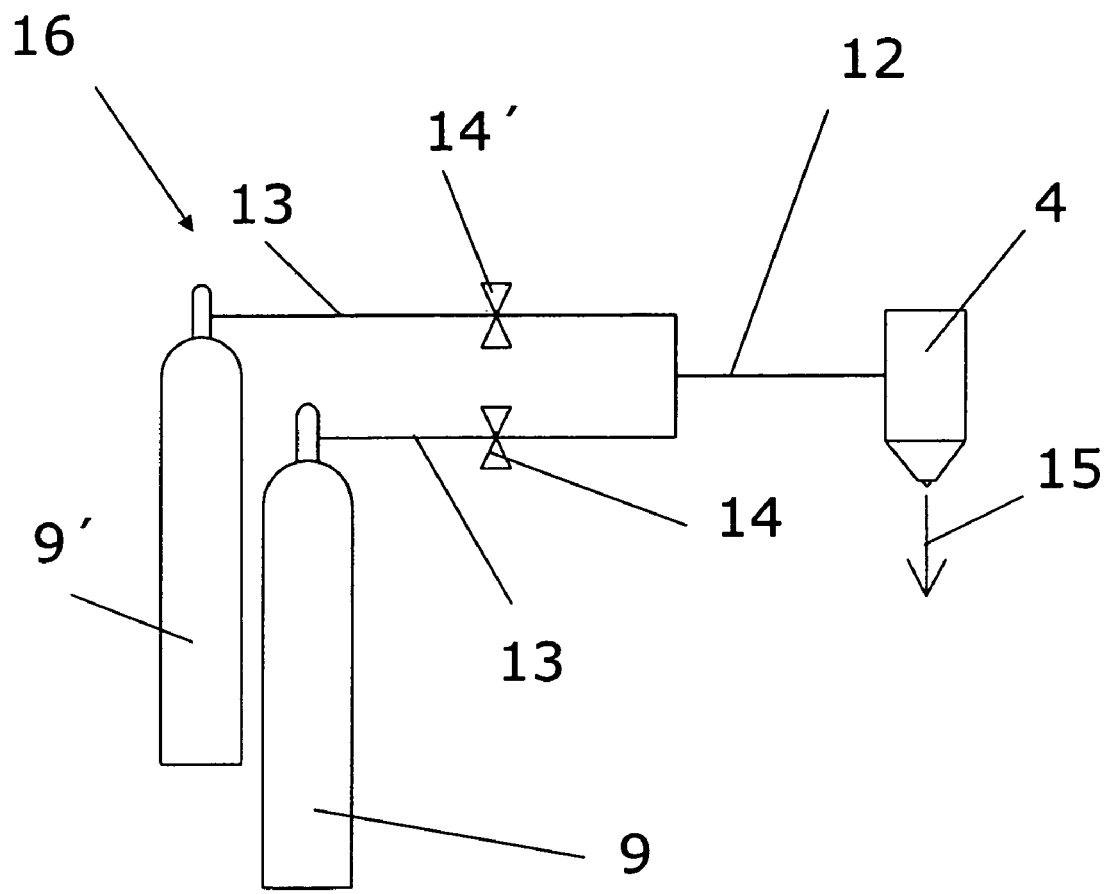
FIG. 2 shows a configuration for flushing a gas supply and a laser processing head of the laser processing system with at least one gas.

FIG. 2 schematically shows a configuration 16 for flushing the line 12, the laser processing head 4 and the other cavities. Lines 13 extend from the gas containers 9, 9' to pressure control valves 14, 14' which control the gas supply to the line 12, to the laser processing head 4 and to the other cavities. As an alternative for pressure control valves, it is also possible to use simple valves in connection with pressure reducers. The supply of the initially used gas from the gas container 9 is disconnected before changing gases by a first pressure control valve 14. The gas remaining in the lines 12, in the laser processing head 4 and in the other cavities expands to approximately ambient pressure. The gas to be subsequently used is now selected via the second pressure control valve 14'. The line 12, the laser processing head 4 and the other cavities, i.e., the whole gas path, are preferably filled with high pressure. The residual gas remaining in the line 12, in the laser processing head 4 and in the other cavities is thereby greatly thinned down. Filling usually takes approximately 0.5 s. The gas supply is subsequently disconnected again and the gas in the line 12 and in the laser processing head 4 expands again to approximately ambient pressure and escapes in the direction of arrow 15. After repeated filling of the gas path and subsequent expansion, the processing gas in the line 12, in the laser processing head 4 and in the other cavities has reached the required degree of purity and laser processing can be continued.

Figure 3A:
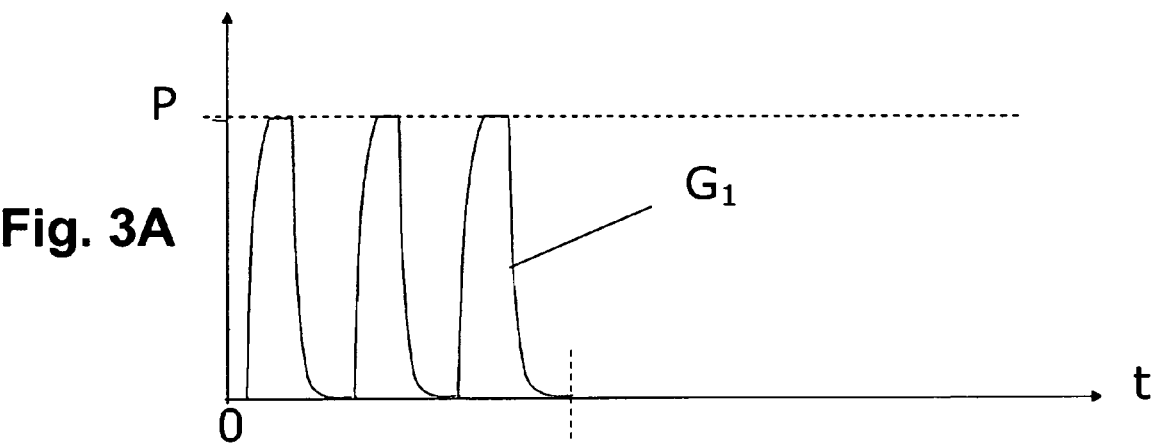
FIGS. 3A and 3B show pressure profiles during flushing using the configuration of FIG. 2.
Figure 3B:
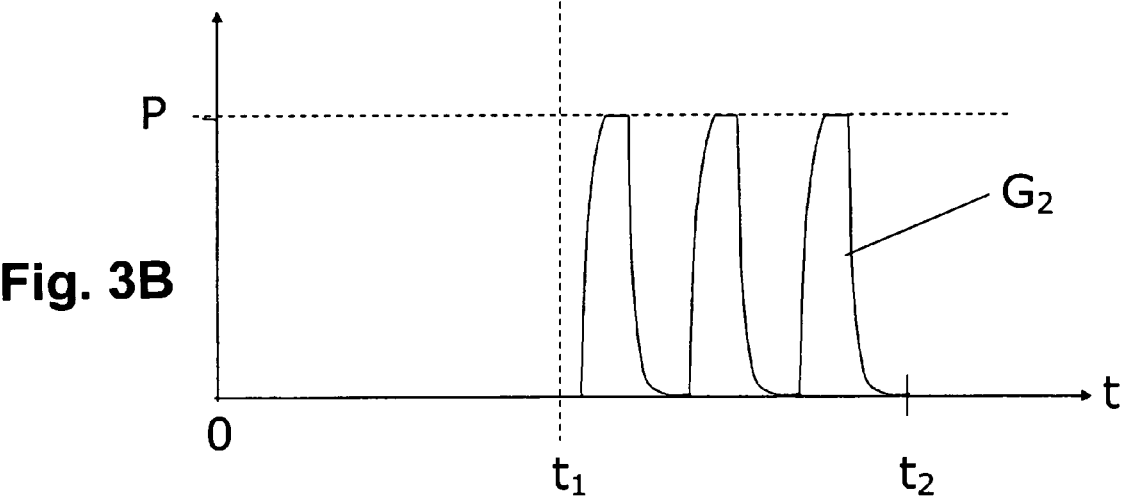

FIGS. 3A and 3B show the pressure profiles resulting from an application of the configuration of FIG. 2. FIG. 3A corresponds to first flushing with a gas $G_1$ up to a time $t_1$. A total of three gas pressure impulses are applied. After each gas pressure impulse with a gas pressure P, the gas $G_1$ expands. FIG. 3B corresponds to first flushing with a gas $G_2$ starting from time $t_1$. Again, a total of three gas pressure impulses is applied. After each gas pressure impulse with a gas pressure P, the gas $G_2$ also expands. It is clear that any number of gas pressure impulses can be applied. The number of gas pressure impulses should be increased, the smaller the diameter of the laser processing nozzle, to obtain sufficient flushing.

A number of embodiments have been described. Nevertheless, it will be understood that various modifications may be made without departing from the spirit and scope of the invention. Accordingly, other embodiments are within the scope of the following claims.

What is claimed is:

1. A method of flushing processing gas in a laser processing machine, the method comprising:

processing a workpiece with a laser in a first workpiece processing operation while continuously delivering a processing gas to the laser via gas lines of the laser processing machine; then, flushing the gas lines of the laser processing machine by introducing a pressurized flushing gas to the lines in multiple gas impulses introduced at a pressure higher than a residual gas pressure remaining in the lines, such that the introduced flushing gas, different from the processing gas, expands in the lines and mixes with any residual processing gas between successive flushing gas impulses; and then processing the workpiece with the laser in a second workpiece processing operation, the first and second processing operations being successive workpiece processing operations between which the flushing of the gas lines is performed.

2. The method of claim 1 wherein the pressure of the impulse is greater than about 6 bars.

3. The method of claim 1 wherein the residual gas pressure falls to approximately atmospheric pressure between successive flushing gas pressure impulses.

4. The method of claim 1 further comprising selecting a number of successive pressure impulses based on a diameter of a laser processing nozzle of the machine.

5. The method of claim 4 wherein a relatively greater number of successive pressure impulses is selected for relatively smaller nozzle diameters.

6. The method of claim 1 wherein the processing gas is oxygen and the flushing gas is nitrogen.

7. The method of claim 1 wherein the flushing gas comprises a second processing gas, and wherein the second workpiece processing operation is performed with the second processing gas.

8. A method of flushing processing gas front lines or cavities of a laser processing machine, the method comprising:

processing a workpiece with a laser while continuously delivering a first processing gas to the workpiece via gas lines of the laser processing machine; then, between successive workpiece processing operations, flushing the gas lines of the laser processing machine by introducing a pressurized flushing gas to the lines in multiple gas impulses introduced at a pressure higher than a residual gas pressure remaining in the lines;

such that the introduced flushing gas, different from the processing gas, expands in the lines and mixes with any residual processing gas between successive flushing gas impulses; and then performing a second laser processing step while continuously delivering a second processing gas to the lines of the laser processing machine.

9. The method of claim 8 wherein the second processing gas has the same composition as the flushing gas.

10. The method of claim 9 wherein one of the processing gases is nitrogen and the other is oxygen.

11. The method of claim 8 wherein the pressure of the impulse is greater than about 6 bars.

12. The method of claim 8 wherein the residual gas pressure falls to approximately atmospheric pressure between successive flushing gas pressure impulses.

13. The method of claim 8 further comprising determining the level of residual processing gas in the lines and delivering the successive flushing gas pressure impulses until the lines are substantially free of residual processing gas.

* * * * *

UNITED STATES PATENT AND TRADEMARK OFFICE
CERTIFICATE OF CORRECTION

PATENT NO. : 7,741,579 B2  Page 1 of 1
APPLICATION NO. : 11/363541
DATED : June 22, 2010
INVENTOR(S) : Martin Lambert and Uwe Mienhardt It is certified that error appears in the above-identified patent and that said Letters Patent is hereby corrected as shown below:

Column 5:
In Claim 8, delete "front" and insert --from--.

Signed and Sealed this

Twenty-first Day of September, 2010

David J. Kappos
*Director of the United States Patent and Trademark Office*